United States Patent
Bryan et al.

(10) Patent No.: US 6,237,244 B1
(45) Date of Patent: *May 29, 2001

(54) CENTRIFUGAL PELLET DRYER FOR SMALL APPLICATIONS

(75) Inventors: David E. Bryan, Buchanan; Carl M. Dudding, Eagle Rock, both of VA (US)

(73) Assignee: Gala Industries, Inc., Eagle Rock, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,600

(22) Filed: Oct. 19, 1998

(51) Int. Cl.[7] .................................................. F26B 17/24
(52) U.S. Cl. ................................ 34/59; 34/173; 34/182; 34/183
(58) Field of Search .................................. 34/58, 59, 128, 34/147, 166, 179, 182, 183; 210/277, 369, 374, 377

(56) References Cited

U.S. PATENT DOCUMENTS

| | | | |
|---|---|---|---|
| 3,458,045 | * 7/1969 | Dudley | 210/95 |
| 4,218,323 | * 8/1980 | McCracken | 210/415 |
| 4,476,019 | 10/1984 | Nowisch et al. | 210/232 |
| 4,565,015 | * 1/1986 | Hundley, III | 34/182 |
| 4,570,359 | 2/1986 | Rudolph | 34/58 |
| 4,896,435 | * 1/1990 | Spangler, Jr. | 34/58 |
| 5,187,880 | 2/1993 | Rudolph | 34/8 |
| 5,197,205 | * 3/1993 | Spada et al. | 34/182 |
| 5,265,347 | * 11/1993 | Woodson et al. | 34/58 |
| 5,505,537 | 4/1996 | Previero | 366/97 |
| 5,611,150 | 3/1997 | Yore, Jr. | 34/58 |
| 5,638,606 | * 6/1997 | Bryan et al. | 34/59 |
| 5,987,769 | 11/1999 | Ackerman et al. | 34/58 |

OTHER PUBLICATIONS

Carter Day International brochure, Micro 2001 Dryer, Spin-away Dryers, M2/Dryer Jun. 1997.

* cited by examiner

*Primary Examiner*—Henry Bennett
*Assistant Examiner*—Pamela A. Wilson
(74) *Attorney, Agent, or Firm*—Jacobson, Price, Holman Stern, PLLC (57) ABSTRACT

A dryer for removing surface moisture from a pelletized product and more specifically a dryer which is constructed with dimensions enabling it to effectively centrifugally remove surface moisture from pellets of resin material received from an underwater pelletizer. The dryer is capable of operating at very low rates and easily cleaned with its overall size enabling it to be effectively used for small operations, especially laboratory applications.

47 Claims, 7 Drawing Sheets

CENTRIFUGAL PELLET DRYER FOR SMALL APPLICATIONS

BACKGROUND OF THE INVENTION

1. Field of the Invention

The present invention generally relates to a centrifugal dryer for removing surface moisture from pellets of resin material having a diameter generally ranging between approximately 0.015 to approximately 0.25 inches received from an underwater pelletizer. More specifically, the present invention relates to a dryer which is constructed with smaller dimensions enabling it to effectively operate at low volume rates and be easily assembled and disassembled to facilitate cleaning and replacement or interchange of components with its overall size enabling it to be effectively used in small applications, especially laboratory applications.

2. Description of the Prior Art

Centrifugal pellet dryers are well known and have been successfully used for many years to separate water from a water and pellet slurry and remove surface moisture from the pellets in order to provide relatively dry surfaces on the pellets for subsequent use. Previously known centrifugal pellet dryers are used for the purpose of removing surface moisture from pelletized products and are usually a relatively large machine for producing a large volume of dried pellets. The following U.S. patents relate to centrifugal pellet dryers:

| | | |
|---|---|---|
| 4,476,019 | 5,187,880 | 5,611,150 |
| 4,570,359 | 5,505,537 | |

The centrifugal pellet dryers disclosed in the above prior patents are primarily used in high volume production of dried pellets and are not practical for operation at low rates of production and are not sized to use in a laboratory application or other small operations.

Accordingly, the present invention seeks to overcome this deficiency in the prior centrifugal pellet drying constructions by incorporating unique features not shown in the prior art. For example, the pellet dryers of the prior art do not have a sectional housing with the sections being connected together by bolted external flanges for easy separation and access to the internal components. The above patents also fail to disclose a centrifugal pellet dryer having a base section attached directly to a tank for receiving the water from the water and pellet slurry thereby eliminating the necessity of using piping systems to drain water from the dryer. In addition, the prior art does not disclose a centrifugal pellet dryer in which the rotor is supported from a single upper bearing with the lower end of the rotor being rotably guided by an alignment bushing which is self lubricating and is cooled by the water of the water and pellet slurry thereby eliminating the need for providing a sealed bearing or other special device to protect a bottom bearing from the water. Still another feature not shown in the prior art is the use of a cylindrical screen in a centrifugal pellet dryer which telescopically engages a recessed edge of cup-shaped support members at the top and bottom ends of the screen and is supported by a pair of holding clips in the form of hooks to engage supporting pins on the upper cup-shaped support. Also, the prior art does not disclose the use of a lift device to assist in lifting and supporting the major components away from the base section to facilitate removal, cleaning and replacement of the dryer components.

SUMMARY OF THE INVENTION

The present invention is a centrifugal pellet dryer for removing surface moisture from resin pellets (approximately 0.015 to approximately 0.25 inches in diameter) and is specifically adapted for use in laboratory applications. The centrifugal pellet dryer of this invention distinguishes from currently available centrifugal pellet dryers which are not suitable for laboratory applications or other small operations. The instant pellet dryer is capable of operation at very low volume rates and is constructed with an overall size and characteristics for easy cleaning which make it desirable for laboratory applications.

The centrifugal pellet dryer of this invention includes a sectional housing having separable sections that are quickly and easily connected together and disconnected from each other. The separable sections are preferably cylindrical top and base sections connected by mating external peripheral flanges that are bolted together. The base section attaches to a top wall of a tank into which the water from the water and pellet slurry is drained, thereby eliminating the necessity of providing any piping system to remove the water from the dryer once separated from the pellets.

The centrifugal pellet dryer of this invention also includes a driven rotor that has a single supporting bearing at the upper end thereof with only an alignment bushing assembly at its lower end. A motor is preferably mounted atop a top plate to which the upper housing section is attached. The rotor supporting bearing is preferably mounted to the top plate and the alignment bushing assembly is preferably part of the lower or base housing section. This structure eliminates the necessity of providing a bottom bearing for the rotor and a sealing arrangement for the bottom bearing to preclude water from entering the bottom bearing thereby simplifying the structure. It also facilitates the easy separation and assembly of the top and base sections relative to each other.

Further, the centrifugal pellet dryer of this invention includes a lift device, preferably in the form of a gas spring lift and support device, to lift the motor, rotor, top plate and upper housing section upwardly away from the lower or base housing section which allows the lifted components to be swung about a vertical axis away from the base section. This lifting, supporting and swinging structure enables removal of the upper section of the housing and screen to facilitate cleaning of the exposed bladed rotor as it remains connected to its driving shaft.

The centrifugal pellet dryer of this invention also preferably includes a cylindrical one-piece screen which is telescopically engaged with recessed end edges on top and bottom support structures. The screen also includes support hooks engaging the top support structure to removably support the screen within the top and base sections of the housing to facilitate assembly and disassembly of the screen in the dryer. Additionally, the tank has a screen bottomed drawer receiving water from the base section of the dryer for removing any solid material or pellets which may be entrained in the water.

Accordingly, it is an object of the present invention to provide a centrifugal pellet dryer for removing surface moisture from pelletized product that is constructed uniquely for use in laboratory applications and other small operations. The pellet dryer of this invention includes a sectional housing in which multiple sections are connected by external flanges that are bolted together to enable quick and easy assembly and disassembly of the housing. The pellet dryer housing includes a base section constructed to communicate directly to a debris separating drawer on a top wall of a water drain tank thereby eliminating the necessity of providing a piping system to drain water from the dryer.

Another object of the present invention is to provide a pellet dryer in which the rotor is rigid with a shaft supported by a single upper bearing and having an alignment bushing assembly guiding rotation of the lower end of the rotor thereby eliminating the need for a sealing device or special waterproof design to protect a bottom bearing from water within the dryer.

A further object of this invention is to provide a centrifugal pellet dryer for laboratory applications as set forth in the preceding objects in which the dryer is capable of operation at very low volume rates and is constructed of a relatively overall small size and of separable and replaceable components rendering it easily cleanable, repairable and otherwise well suited for laboratory or small applications.

A still further object of the invention is to provide a gas lift for supporting and lifting the motor, the rotor and the upper housing section away from the base section when the dryer is being disassembled for repair and cleaning.

Still another object of the present invention is to provide a pellet dryer including a one-piece cylindrical screen having upper and lower edges telescopically engaged with recessed edges of top and bottom supports in the housing and support hooks engaging with support pins on the top support.

A final object to be set forth herein is to provide a pellet dryer which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming apart hereof, wherein like numerals refer to like parts throughout.

DESCRIPTION OF THE PREFERRED EMBODIMENTS

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Referring now specifically to the drawings, the centrifugal pellet dryer of the present invention is generally designated by reference numeral 10 and includes a vertically disposed generally cylindrical housing generally designated by the numeral 12 having a vertical rotor 14 rotatably mounted therein and which is enclosed by a screen 16. The rotor 14 is driven by a motor 18 preferably mounted atop the upper end of the dryer. The lower end of the dryer includes a slurry inlet 20 and the upper end of the dryer includes a dried pellet outlet 22. These components generally are found in existing centrifugal pellet dryers. However, certain of the components of the present invention include unique structural features and associations not known in currently available centrifugal pellet dryers.

The housing 12 includes sections preferably including a base or lower section 24 and an elongated upper section 30 which is connected to a top plate 26. The upper section 30 can include reinforcing collars 29 and 31 at the upper and lower ends. The sections 24 and 30 and top plate 26 can be interconnected by circular end flanges 32 secured together by bolts 34. A coupling guard 28 is attached above top plate 26 as by bolts or the like. The housing sections 24 and 30 and top plate 26 are preferably constructed of a substantially rigid material, such as metal, that is sufficiently strong to support the structure of the dryer, is relatively inexpensive and can be constructed in relatively small diameters and heights.

Figure 6:
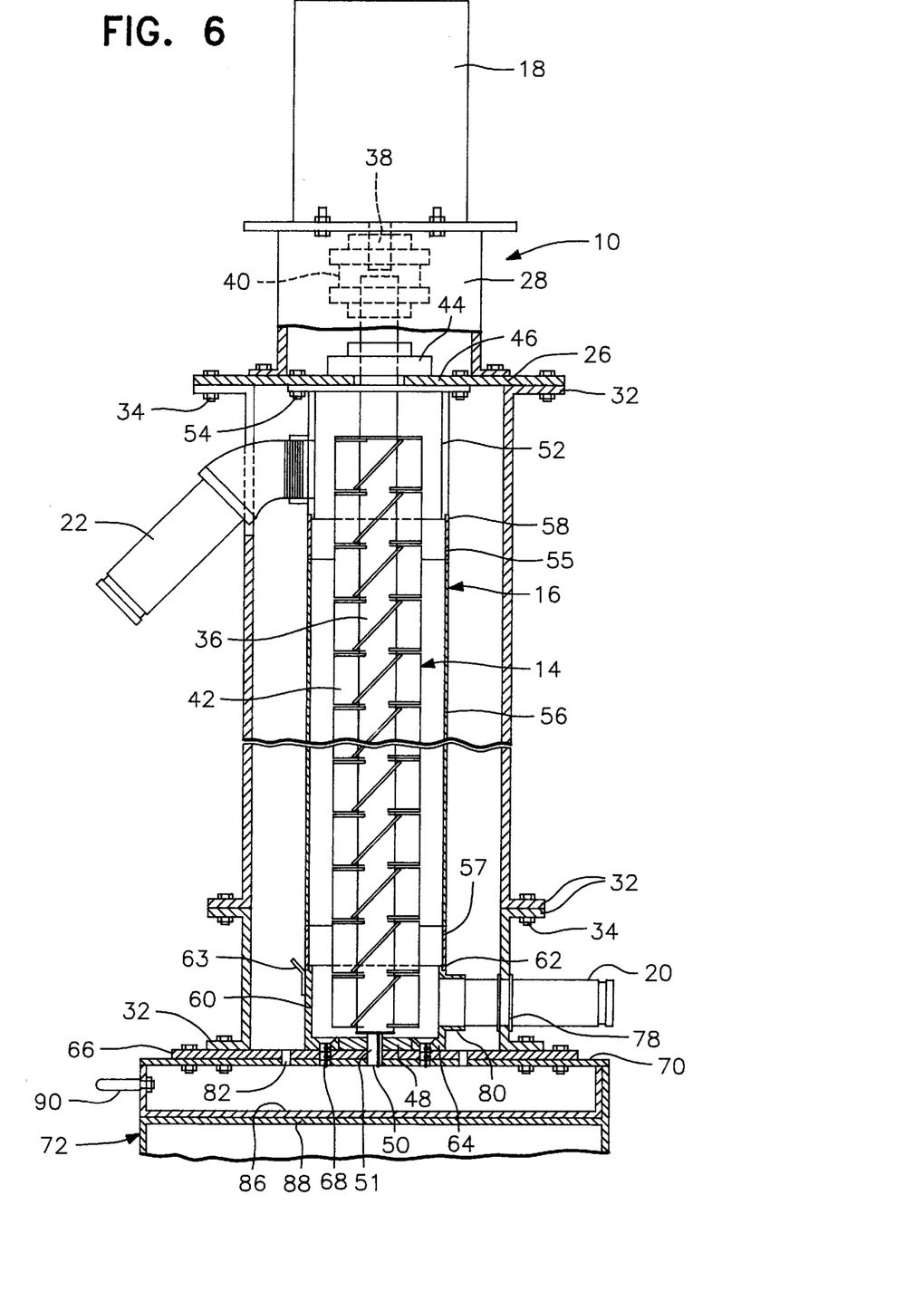
FIG. 6 is a vertical partial sectional view of the dryer of the present invention illustrating the association of the components of the dryer.

The rotor 14 includes a central shaft 36, preferably square, positioned centrally in the vertical housing 12 and is drivingly engaged with a motor output shaft 38 by a drive coupling 40 (see FIG. 6). The upper end of the dryer rotor 14 is provided with a support bearing 44 enclosed within the motor coupling guard 28 and a motor support enclosed by the guard 28 which is supported from the top plate 26 at the upper end of the housing as indicated at reference numeral 46. The support bearing 44 supports the rotor 14 from its upper end and maintains its support in order that the lower end of the rotor shaft 36 can be guided by a bushing 48 mounted in the base section 24 of housing 12. The lower end of the shaft 36 is provided with an axially extending shaft 50 of reduced cross-sectional area and preferably of cylindrical configuration for rotational guided movement in cylindrical opening 51 in alignment bushing 48.

The upper section of the housing 12 includes a downwardly extending cylindrical member 52 secured to the top plate 26 by fastening bolts 54. The screen 16 is a cylindrical member 56 of screen or perforated material which has an upper end in the form of a solid wall 55. The wall 55 engages with a downwardly facing recess 58 in the outer edge of the cylindrical member 52 with the upper end edge of the wall 55 on screen element 56 telescoping over the recess 58 as illustrated in FIG. 6. Likewise, the lower end of the screen element 56 is supported by the top rim 61 of the upwardly facing cylindrical support 60. The top rim 61 includes a recessed upper edge 62 which telescopically receives the lower end of peripheral wall 57 of the screen element 56.

Figure 5:
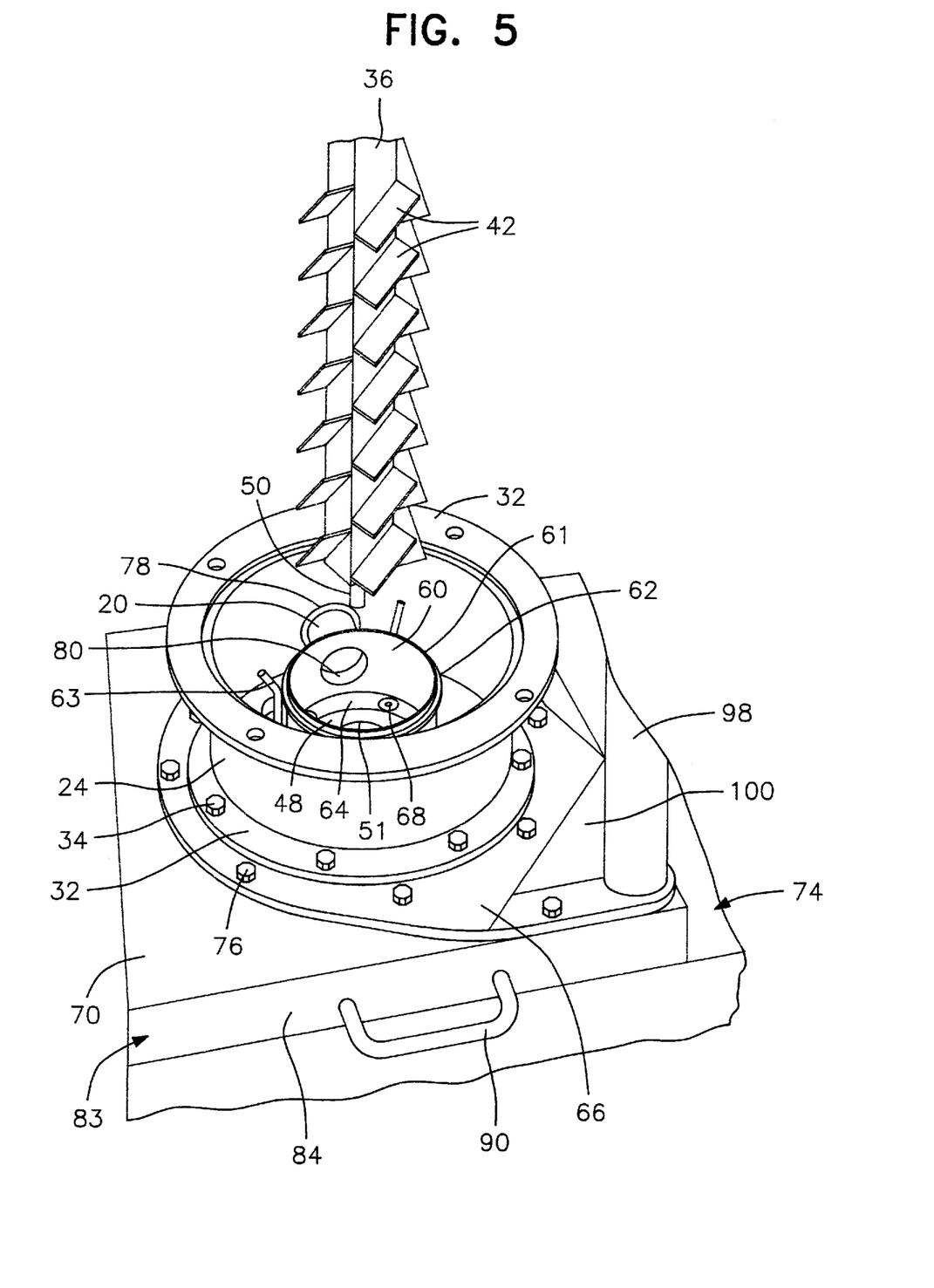
FIG. 5 is a fragmental perspective view of the base section of the housing of the present invention and the components for the lower end portions of the rotor and screen therewith.

The cylindrical member 60 also preferably includes a plurality of upwardly and outwardly angled rods 63 on the exterior thereof as shown in FIG. 5 to guide the lower end of the screen 16 onto the recess 62 formed on the outer edge of the upper end of cylindrical member 60. The angled rods 63 thus facilitate assembly of the screen element 56 onto cylindrical member 60 in relation to the housing and rotor. The lower cylindrical member 60 includes a bottom wall 64 that is secured to a plate 66 by fastening devices 68. The plate 66 is secured to the top wall 70 of a debris separating drawer assembly generally designated by reference numeral 72 positioned on top of a water drain tank generally designated by reference numeral 74 with fastening bolts 76 securing the plate 66 in position. It will be observed that alignment bushing 48 is preferably disk shaped and can be replaced if and when the opening 51 becomes worn. Bushing 48 is positioned in the center of bottom wall 64 so that extending shaft 50 and, therefore, rotor shaft 36 are both positioned substantially along the central vertical axis of the dryer 10 within screen 16 and housing 12.

The base section 24 of the housing 12 includes the inlet 20 which extends through a fitting 78 in the peripheral wall of the base section 24. The slurry inlet 20 extends into and is connected to a fitting 80 in the cylindrical member 60 thus communicating the slurry inlet 20 with the interior of the cylindrical member 60 and thus screen 16. This enables the rotor 14 to move and lift the slurry and pellets upwardly and directing them outwardly toward the screen element 56 so that water entrained with the pellets will be discharged through the screen. The water discharged through the screen and outwardly of the lower cylindrical member 60 can pass through the plate 66 and the top wall 70 through apertures 82 thus enabling the water to drain into the debris separating drawer assembly 72.

The separating drawer assembly 72 includes a slidable drawer 83 having a peripheral vertical wall 84 and a screen or perforated bottom 86. The drawer 83 is slidably supported on ledges 88 at the bottom of the drawer assembly 72. A handle 90 is provided at the front of the drawer 83 to move the drawer outwardly to remove any solids or pellets which may have been discharged through the apertures 82 so that only water is discharged into a water drain tank 92. The tank 92 is also provided with an opening 94 to facilitate discharge of water separated from the pellets. As the pellets are moved upwardly they are dried by virtue of the forces of gravity and the centrifugal force of the pellets being discharged toward the screen in a manner well known in the pellet drying art. Once the dried pellets reach the upper end of the rotor, they are discharged centrifugally into the dry pellet outlet 22 in communication with cylindrical member 52 and then into a suitable container.

Figure 1:
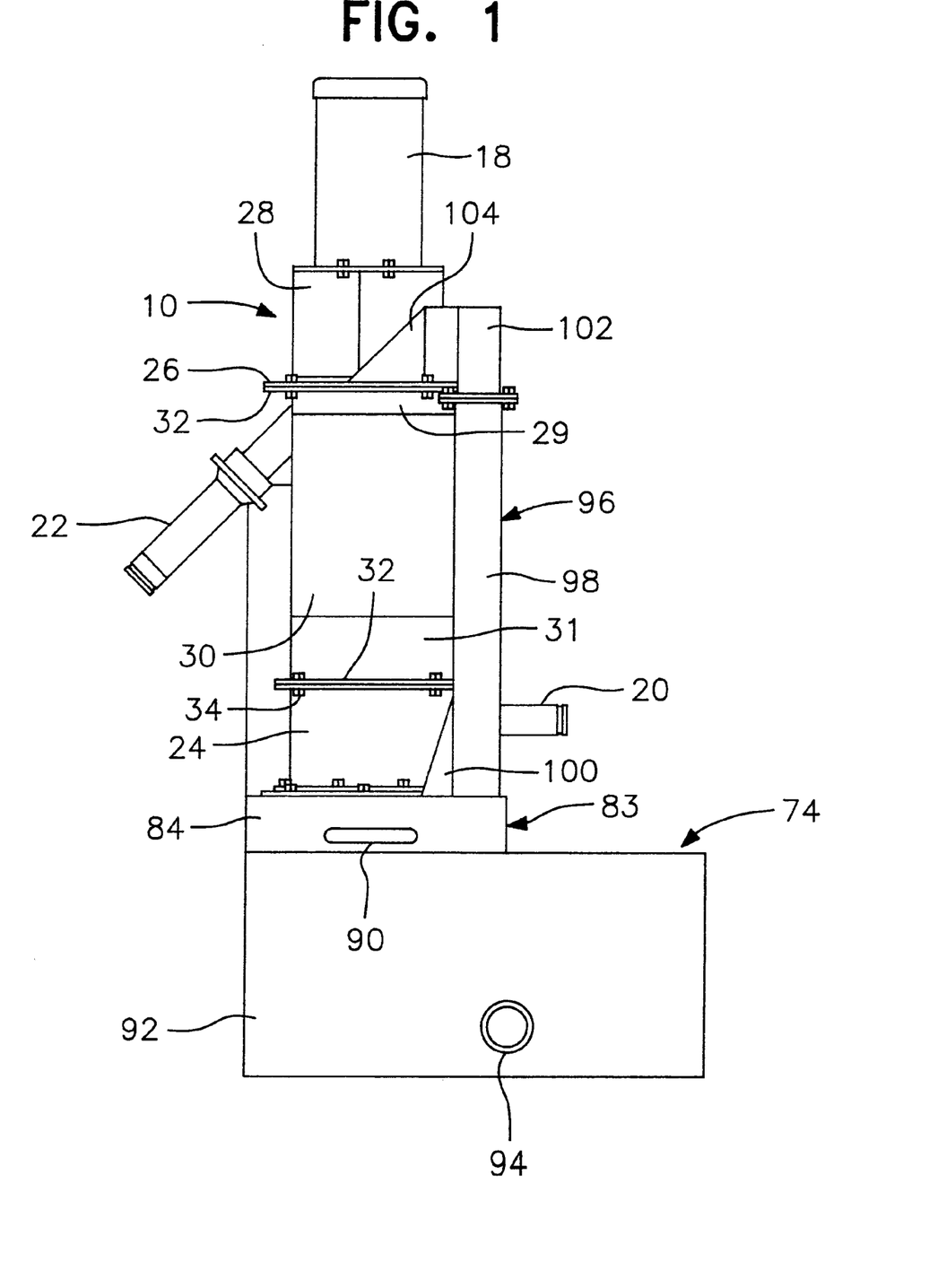
FIG. 1 is a side elevational view of the centrifugal pellet dryer of the present invention illustrating the relationship of the motor, housing, drain tank, inlet and outlet and the gas spring lift device.
Figure 2:
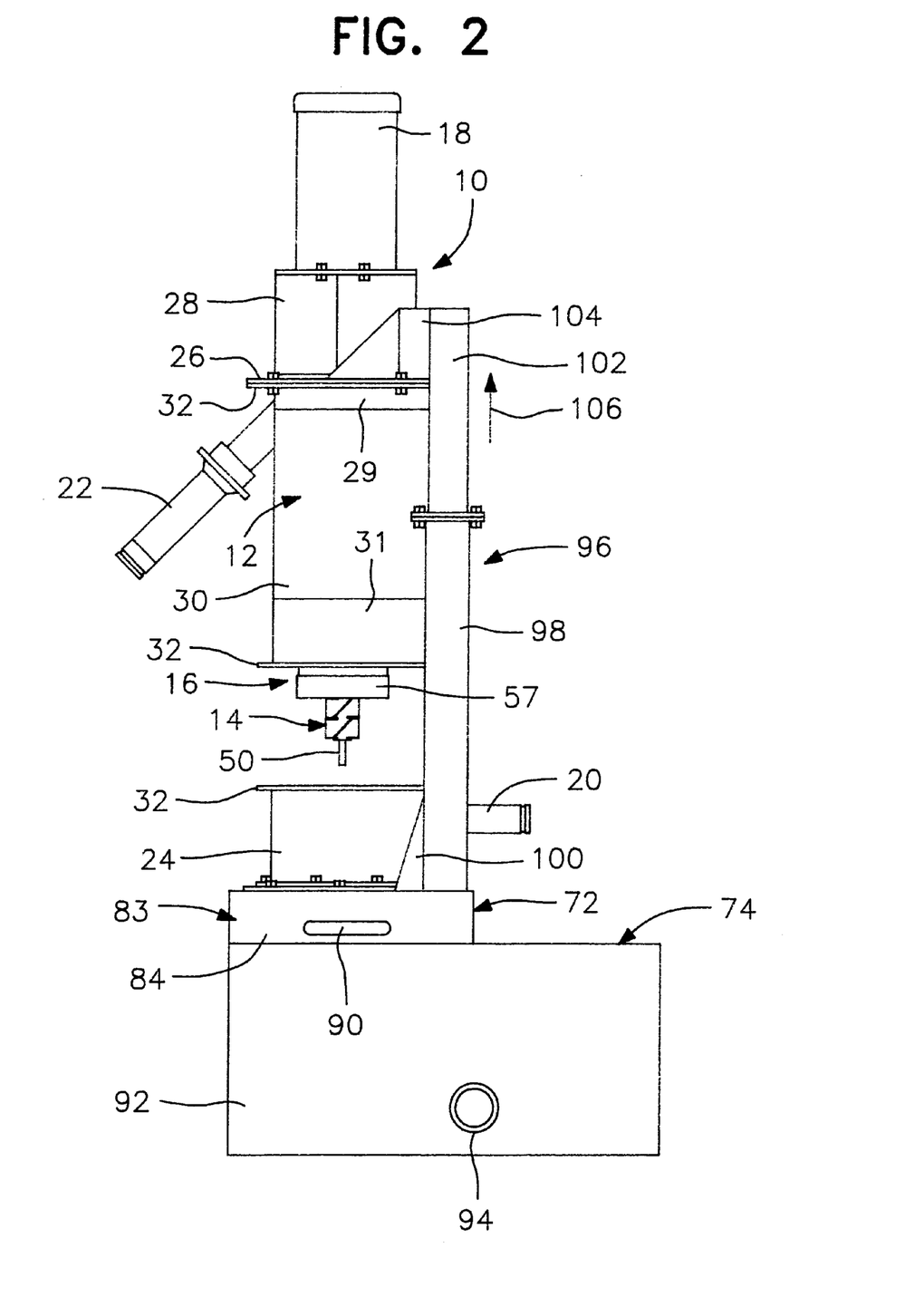
FIG. 2 is a side elevational view similar to FIG. 1 but illustrating the base section of the housing detached from the remainder of the housing which has been lifted vertically away by the gas spring lift device.

The upper section 30, the top plate 26, the coupling guard 28 and the motor 18 and its support along with the rotor 14 and screen 16 are all supported by a lifting device, preferably gas spring lift device 96. The gas spring lift device 96 includes a stationary outer tube 98 rigidly affixed to plate 66 by bracket structure 100 and fastening bolts. A swiveled vertically movable telescopic upper tube 102 is attached to the motor support and upper section 26 of the housing 12 by bracket structure 104. This gas spring 96 will assist in lifting and will support the upper section 30 of the housing and the rotor, screen, motor support and motor when the bolts 34 interconnecting the flanges 32 between the upper section 30 and base section 24 of the housing are removed. The vertical movement of the upper tube 102 is illustrated in FIG. 2 as indicated by the arrow 106.

Figure 3:
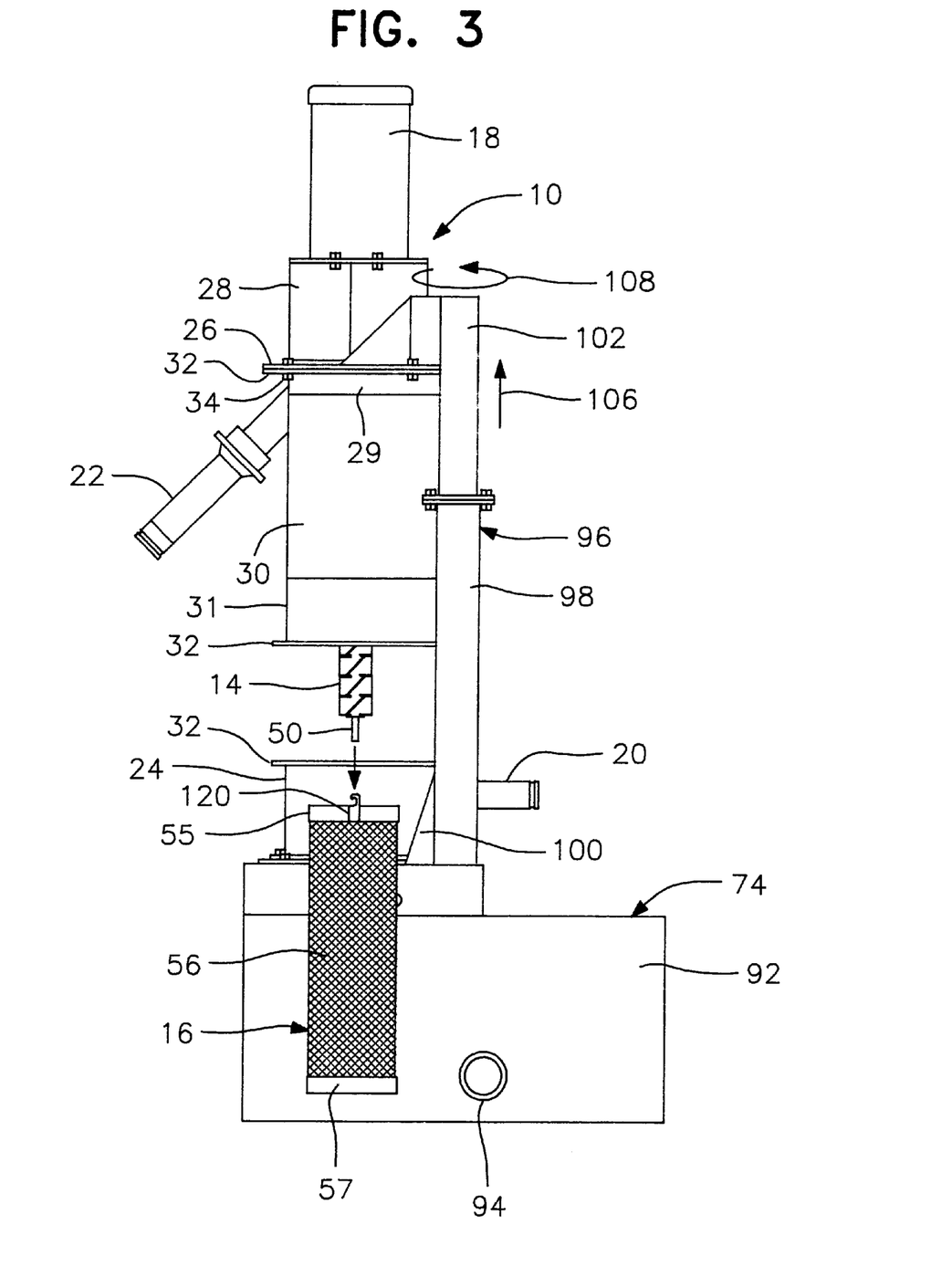
FIG. 3 is a side elevational view similar to FIG. 2 but illustrating the swiveling movement of the lifted components of the dryer and the dryer screen being removed from enclosing relation to the rotor.
Figure 4:
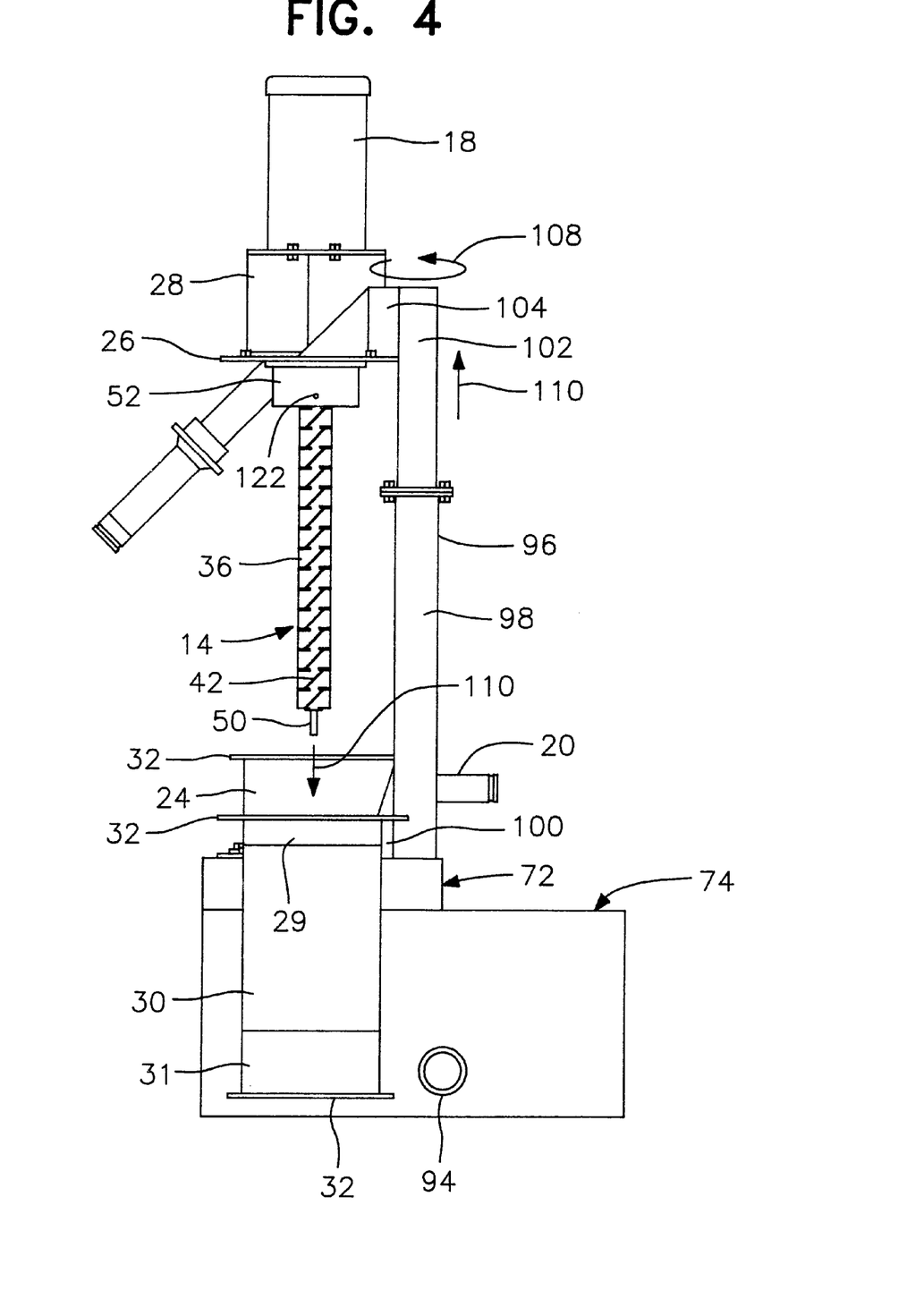
FIG. 4 is a side elevational view similar to FIG. 3 and illustrating the upper section of the housing being removed to completely expose the rotor.

The upper tube 102 of the gas spring 96 is also capable of swivel movement which enables the lifted components to rotate about the vertical axis of the gas spring as indicated by arrow 108 in FIG. 3. Thus, the upper section 30 of the housing and those components above the upper section along with the rotor 14 and screen 16 can then rotate out of alignment with the base section 24. Once the upper section 30 has been rotated out of alignment with the base section 24, the screen 16 can be dropped downwardly and removed as illustrated in FIG. 3. Also, this structure enables the upper section 30 of the housing 12 to be separated from the top plate 26 and dropped downwardly as indicated by arrow 110 in FIG. 4. This separation enables removal of the upper section of the housing thereby providing easy access to the rotor 14 which remains attached to the shaft coupling 40 as illustrated in FIG. 4. The shaft 36 and inclined blades 40 can then be easily cleaned while being supported above the base section, or the axial extension 50 may be lowered into the guide bushing 48 to stabilize the lower end of the rotor 14 while being cleaned.

FIGS. 3 and 4 illustrate an additional support for the screen which is preferred in most installations. The additional support is in the form of two (or more) upwardly extending hooks 120 rigidly connected to the upper end wall 55 of the screen member 56. The hooks 120 are preferably oriented diametrically on the outer surface of wall 55 and open in opposite peripheral directions to engage with outwardly projecting pins 122 on top support structure 52. The hooks 120 and screen member 56 must be rotated counterclockwise a partial revolution to release the screen to be moved downwardly for removal.

Figure 7:
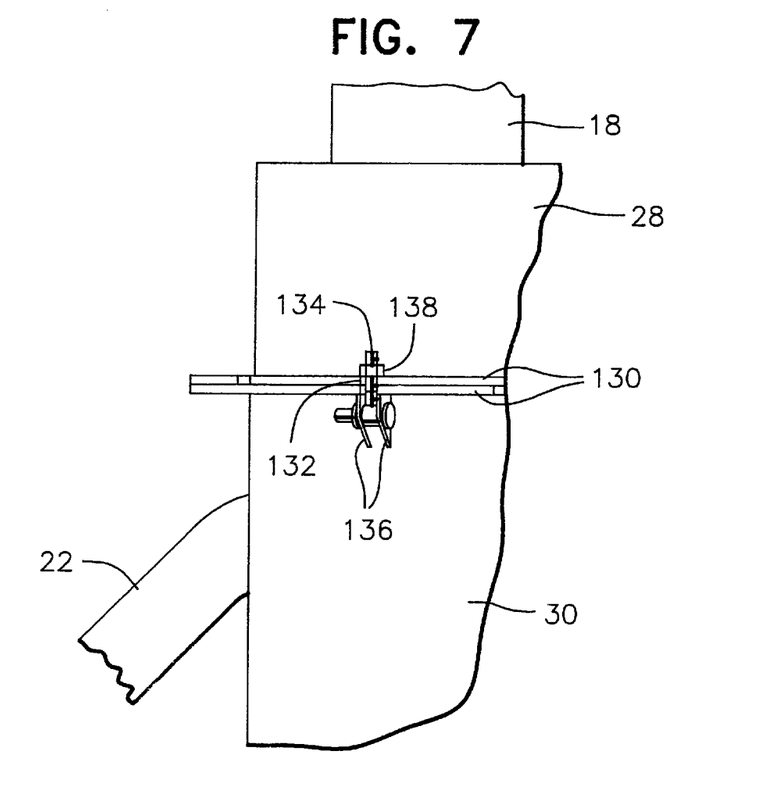
FIG. 7 is a fragmental enlarged elevational view of a portion of the housing illustrating a preferred form of bolted flange arrangement utilizing swing bolts.

FIG. 7 illustrates an additional preferred connection between housing sections in which each of the flanges 130 have a notch or slot 132 which has a swing bolt 134 extending therethrough. The lower end of swing bolt 134 is, pivotally supported by support lugs 136 attached to the housing. The upper end of the bolt 134 includes a nut 138 which can be loosened sufficiently to enable pivotal movement of the bolt 134 without complete removal of the nut 138 and without separating the bolt from the housing thereby greatly facilitating the assembly and disassembly of the housing sections of the dryer.

Figure 8:
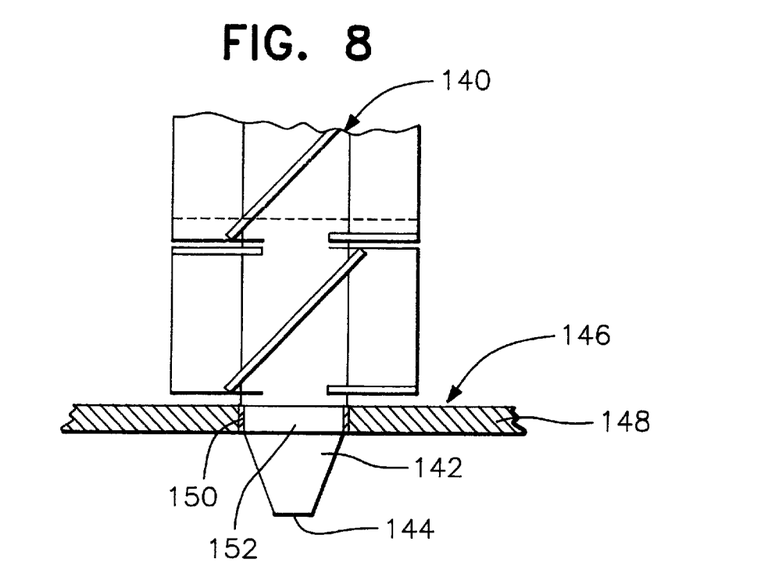
FIG. 8 is a fragmental enlarged sectional view of a preferred form of guide bushing assembly for the lower end of the rotor.

FIG. 8 illustrates an additional preferred form of the bushing for the lower end of the rotor in which the lower end of rotor 140 is provided with a generally tapered lower end 142 with a flat lower end 144. In lieu of the bushing 48, a two-piece bushing assembly 146 is employed to guide the lower end of the rotor 140 during rotation. The bushing assembly 146 includes an outer member 148 of resin material and an inner sleeve or bushing 150 of metal. The sleeve or bushing 150 is cylindrical and rotatably engages and guides a cylindrical upper end portion 152 of the lower end 142 of the rotor 140. The tapered lower end 142 assists in guiding the lower end of the rotor into the guide sleeve or bushing 150. Water passing through the bushing assembly 146 cools and lubricates the sleeve 150 and lower end of rotor 140. Like bushing 48, the bushing assembly 146 is supported in the bottom of the cup-shaped support 60 and can be replaced when necessary.

The function of the rotor 14 or 140, screen 16 and housing 12 together with the slurry inlet 20 and dried pellet outlet 22 are similar to the function of existing centrifugal pellet dryers. However, the manner in which the rotor is supported and driven and guided by a replaceable alignment bushing 48 or bushing assembly 146 and the sectional construction of the housing and the gas spring lift device cooperate to enable the components to be constructed with a reduced diameter housing, screen and reduced size rotor. The housing 12 of this invention can have an outside diameter in the range of 8 to 12 inches while most standard dryers have an outside diameter in the range of 30 to 40 inches. The screen 16 can have a diameter of approximately 6 inches with the outer corners of the blades 42 being spaced approximately 0.400 inch from the screen for optimum removal of water from the pellets. The blades 42 are preferably rectangular with the straight peripheral edges providing agitation of the pellets as they are lifted with the space between the blades and screen permitting some of the pellets to drop past upper blades and picked up by lower blades for more effective separation of water from the pellets. Also, the blade arrangement and configuration and their relationship to the screen reduces wear on the screen as compared to dryers which utilize a substantially continuous lifting and auguring effect that increases frictional engagement between the pellets and screen.

The components of the dryer of this invention are readily disconnected and the weight thereof supported by the gas spring 96 thereby facilitating the handling of the housing, screen, rotor and motor without the necessity of these components being physically lifted by an operator of the pellet dryer. The smaller diameter of the components enables the dryer to be effectively used in a laboratory application, or other small operation, and enables the components to be easily disassembled and assembled, and the components easily cleaned or replaced when disassembled. The screen bottom drawer enables the water draining into the tank to be cleaned of any solid debris or pellets which may pass downwardly from the base section of the housing. The openings communicating the base section of the housing and the screened bottom drawer may be varied in size and frequency to enable gravity liquid flow downwardly from the base section without undue restriction.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A dryer for removing surface moisture from pelletized product in the form of a slurry of pellets and water comprising a housing, a slurry inlet at a lower end portion of said housing, a dried pellet outlet at an upper end portion of said housing, a cylindrical screen mounted within said housing, said screen including a peripheral perforated wall in spaced relation to the housing, a rotor positioned within said screen, axially inclined radial lifting blades on said rotor moving in a path concentric with and adjacent said screen, and a motor drivingly connected to said rotor, said slurry inlet communicating with the interior of said screen, said dried pellet outlet communicating with the interior of said screen, said housing including separable upper and lower sections, said motor being mounted on said upper end of said housing section driving said rotor through a bearing structure in said upper section with a lower end of said rotor guidingly received in an alignment assembly in said lower section thereby eliminating a sealed bearing structure for the lower end of said rotor.

2. The dryer as defined in claim 1, wherein said housing is sections include flanges and bolts detachably connecting said sections of the housing.

3. The dryer as defined in claim 2, wherein a lower end of said rotor includes a cylindrical body portion journaled in said alignment assembly.

4. The dryer as defined in claim 3, wherein said housing includes upper and lower cylindrical members in alignment with and supporting engagement with upper and lower ends of said screen, the ends of the screen and cylindrical members including an interfitted recessed relation whereby moisture passing through the screen will pass downwardly for passage into a tank, said lower cylindrical member including a plurality of upwardly diverging rods guiding a lower end of the screen into interfitted relation with an upper end of said lower cylindrical member.

5. The dryer as defined in claim 3, wherein said alignment assembly is a bushing assembly which includes a replaceable metal sleeve.

6. The dryer as defined in claim 1, wherein a lower end of said rotor includes an axial extension rotatably engaged with said alignment bushing assembly, said assembly being fixed in substantially concentric relation to the screen and said lower section of the housing and being lubricated and cooled by water from said slurry.

7. The dryer as defined in claim 1, wherein said housing includes upper and lower cylindrical members in alignment with and supporting engagement with upper and lower ends of said screen, the ends of the screen and cylindrical members including an interfitted relation whereby moisture passing through the screen will pass downwardly exteriorly of the lower cylindrical member for passage into a tank.

8. The dryer as defined in claim 7, wherein said screen includes a pair of hooks on an upper end, said upper cylindrical member including a pair of projecting pins detachably supporting said hooks and screen.

9. The structure as defined in claim 7, wherein said screen includes a pair of upstanding hooks at the upper end thereof, said upper cylindrical member including a pair of projecting pins for detachably supporting engagement with said hooks.

10. The structure as defined in claim 9, wherein said hooks open peripherally of said screen to enable the screen to be assembled onto and separated from said upper cylindrical member by partial rotation of the screen.

11. The dryer as defined in claim 1, wherein said alignment assembly is a bushing assembly.

12. A dryer for removing surface moisture from pelletized plastic product comprising a housing, a water and pellet slurry inlet at a lower end portion of said housing, a dried pellet outlet at an upper end portion of said housing, a screen mounted within said housing, said screen including a peripheral perforated wall in spaced relation to the housing, a rotor positioned within said screen for lifting said pellets upwardly within said screen, a motor drivingly connected to said rotor, said slurry inlet communicating with the interior of said screen, said pellet outlet communicating with the interior of said screen, said housing including a separable base section having a water discharge, said base section supporting an upper section, of said housing and a lift device connected with said housing above said base section for elevating said housing upper section above said base section when the upper section is separated from said base section.

13. The dryer as defined in claim 12, wherein said base section is communicated with a tank for receiving moisture passing through the screen, through the base section and into the tank.

14. The dryer as defined in claim 12, wherein a lower end of said rotor is guided by an alignment bushing assembly fixed in relation to the screen and base section of the housing.

15. The dryer as defined in claim 12, wherein said housing includes upper and lower cylindrical members in alignment with and supporting engagement with upper and lower ends of said screen, the ends of the screen and cylindrical members including an interfitted relation whereby moisture passing through the screen will pass downwardly through a base section into said tank.

16. The dryer as defined in claim 15, wherein an upper end of said screen and said upper cylindrical member have coacting support structure to detachably support said screen from said upper cylindrical member.

17. The dryer as defined in claim 16, wherein said screen support structure includes a pair of laterally opening hooks attached to and extending above an upper end of said screen and a pair of projecting pins on said upper cylindrical member.

18. The dryer as defined in claim 12, wherein said housing sections are interconnected by flanges on said housing sections and bolt and nut assemblies secure said flanges together.

19. The dryer as defined in claim 18, wherein each of said bolts pivotal support structure, each of said flanges includes radial notches receiving said bolts and enabling the bolts to swing into and out of said notches when said nuts are loosened.

20. The dryer as defined in claim 12, wherein said lift device is a gas spring lift device.

21. A centrifugal pellet dryer comprising a housing, a screen and an elevation rotor oriented in concentric relation with the rotor being driven from an upper end and the screen including a pellet slurry inlet at a lower portion and a dried pellet outlet at an upper portion, said housing supported from a top wall of a tank and in communication with the tank for discharge of water from said screen and housing directly into the tank, said tank including a screen bottomed drawer receiving water from said housing to separate solid particles entrained in said water, said drawer being slidable mounted in a top area of said tank to enable removal of solid particles from the drawer.

22. A dryer for removing surface moisture from pelletized product in the form of a slurry of pellets and water comprising a housing including separable upper and lower sections, a screen mounted within said housing, an elevating rotor positioned within said screen, a motor drivingly connected to said rotor, a slurry inlet communicating with a lower interior portion of said screen, a dried pellet outlet communicating with an upper interior portion of said screen, said motor being mounted on said upper section of said housing and driving said rotor through a bearing structure in said upper section of the housing with a lower end of said rotor guidingly received in an alignment assembly in said lower section of the housing.

23. The dryer as defined in claim 22, wherein a lower end of said rotor includes an axial extension rotatably engaged with said alignment bushing assembly, said alignment assembly being fixed in concentric relation to the screen and said lower housing section and being lubricated and cooled by water removed from said slurry.

24. The dryer as defined in claim 23, wherein said extension on said lower end of said rotor includes a cylindrical portion journaled in said alignment assembly, and said alignment assembly includes a replaceable component which engages said rotor cylindrical portion.

25. A dryer as defined in claim 24, wherein said rotor extension also includes a tapered tip end for guiding said extension into said replaceable component.

26. The dryer as defined in claim 24, wherein said alignment assembly is a bushing assembly and said replaceable component is a metal sleeve within said bushing assembly.

27. The dryer as defined in claim 22, wherein said screen is generally cylindrical and said housing includes upper and lower cylindrical members in alignment with and in supporting engagement with upper and lower ends of said screen, the ends of the screen and cylindrical members including an interfitted relation whereby moisture passing through the screen will pass downwardly exteriorly of the lower cylindrical member for passage into a tank.

28. The dryer as defined in claim 22, wherein said alignment assembly is a bushing assembly.

29. A dryer for removing surface moisture from plastic pellets produced in an underwater pelletizer which comprises a housing, a screen mounted within said housing, an elevating rotor positioned within said screen, a motor drivingly connected to said rotor, a water and pellet slurry inlet communicating with the interior of said screen adjacent a lower end thereof, a dried pellet outlet communicating with the interior of said screen adjacent an upper end thereof, said housing including a separable base section having a water discharge and an upper section supported on said base section, and a lift device for elevating said upper section of said housing above said base section when the upper section is separated from said base section.

30. The dryer as defined in claim 29, wherein said base section is communicated with a tank for receiving moisture passing through the screen, through the base section and into the tank.

31. The dryer as defined in claim 30, wherein said tank includes a screen member mounted in a top area of said tank for receiving water from said housing to separate solid particles entrained in said water.

32. The dryer as defined in claim 29, wherein a lower end of said rotor is guided by an alignment bushing assembly fixed in relation to the screen and base section of the housing.

33. The dryer as defined in claim 29, wherein said housing includes upper and lower cylindrical members in alignment with and supporting engagement with upper and lower ends of said screen, the ends of the screen and cylindrical members including an interfitted relation whereby moisture passing thorugh the screen will pass downwardly through said base section into said tank.

34. The dryer as defined in claim 33, wherein an upper end of said screen and said upper cylindrical member having coacting support structure to detachably support said screen from said upper cylindrical member.

35. The dryer as defined in claim 29, wherein said housing sections are interconnected by flanges on said housing sections and bolt and nut assemblies securing said flanges together.

36. The dryer as defined in claim 35, wherein each of said bolts include pivotal support structure, each of said flanges including radial notches receiving said bolts and enabling the bolts to swing into and out of said notches when said nuts are loosened.

37. The dryer as defined in claim 29, wherein said water and pellet slurry inlet communicates into said screen through said housing base section and said dried pellet outlet communicates into said screen through said housing upper section.

38. The dryer as defined in claim 29, wherein said lift device is also rotatable to rotate said housing upper section, said rotor and said screen away from vertical alignment with said base section.

39. The dryer as defined in claim 29, wherein said lift device is a gas spring lift device.

40. A dryer for removing surface moisture from pelletized product comprising a housing having an upper section and a base section, a screen mounted within said housing, an elevating rotor positioned within said screen, a motor drivingly connected to said rotor, a water and pellet slurry inlet communicating with the interior of said screen, a dried pellet outlet communicating with the interior of said screen, said base section of the housing being separable from the upper section and having a water discharge, and a lift device to lift said upper section of the housing, rotor and screen generally vertically away from and out of said base section, said lift device also being rotatable to rotate said upper section of the housing, rotor and screen away from vertical alignment with said base section.

41. The dryer as defined in claim 40, wherein said water and pellet slurry inlet communicates with the interior of said screen adjacent a lower end of said screen through said housing base section and said dried pellet outlet communicates with the interior of said screen adjacent an upper end of said screen through said housing upper section.

42. The dryer as defined in claim 40, wherein said housing includes a top plate at the top end thereof, said upper section and said screen each detachably supported by said top plate and, upon removal of said upper section and said screen, said rotor becomes fully exposed.

43. A dryer as defined in claim 40, wherein said screen is generally cylindrical.

44. The dryer as defined in claim 40, wherein said lift device is a gas spring lift device.

45. A dryer for removing surface moisture from plastic pellets produced in an underwater pelletizer which comprises a housing having a top plate section, an upper cylindrical section and a base section, a tubular screen mounted within said housing, an elevating rotor positioned within said screen and supported from said top section, a motor mounted on said top plate section and drivingly connected to said rotor, a water and pellet slurry inlet and a dried pellet outlet each communicating with the interior of said screen, said base section of the housing being separable from the upper section and having a water discharge, said housing upper section being separable from said housing top plate section, and a lift device to lift said top plate section and upper section of the housing, said rotor and said screen generally vertically away from and out of said base section, said rotor being exposed upon removal of said upper section and said screen.

46. The dryer as defined in claim 45, wherein said lift device also is rotatable to rotate said top plate section and said upper section of the housing, said rotor and said screen away from vertical alignment with said base section.

47. The dryer as defined in claim 45, wherein a lower end of said rotor is guided by an alignment bushing assembly fixed in relation to the screen and base section of the housing.

\* \* \* \* \*